United States Patent
Troxler et al.

[15] 3,692,836
[45] Sept. 19, 1972

[54] 1-(2-HYDROXY-3-AMINO-PROPOXY-9-FLUORENONES AND THE SALTS THEREOF

[72] Inventors: Franz Troxler, 39 Drosselstrasse, 4103, Bottmingen; Fritz Seemann, 52 Spalenring, 4000, Basel, both of Switzerland

[22] Filed: May 27, 1970

[21] Appl. No.: 41,057

[30] Foreign Application Priority Data

June 3, 1969 Switzerland..............8402/69

[52] U.S. Cl.............260/570.7, 260/141, 260/348 B, 260/348.6, 260/465 E, 260/501.18, 260/578, 260/590, 424/304, 424/330
[51] Int. Cl............................................C07c 93/06
[58] Field of Search.........260/465 E, 570.7, 570.5 C, 260/570.7, 581.18

[56] References Cited

OTHER PUBLICATIONS

Troxler et al., " Chemical Abstracts," Vol. 71, page 322 (1969)

Primary Examiner—Robert V. Hines
Attorney—Gerald D. Sharkin, Robert S. Honor, Frederick H. Weinfeldt, Richard E. Vila and Walter F. Jewell

[57] ABSTRACT

The invention concerns novel compounds of the formula:

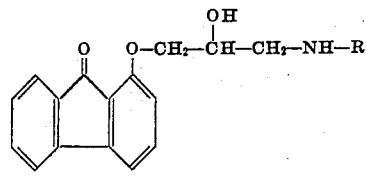

wherein R is methyl, ethyl, isopropyl, sec.butyl, tert.butyl, tert.pentyl, 3-pentyl, cyclopropyl, cyclobutyl, 3-cyanopropyl, 3-phenyl propyl, or adamantyl.

The compounds are useful β-blocking agents and furthermore inhibit platelet aggregation.

5 Claims, No Drawings

1-(2-HYDROXY-3-AMINO-PROPOXY-9-FLUORENONES AND THE SALTS THEREOF

The present invention relates to new compounds of formula I,

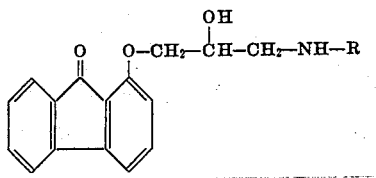

I wherein R is methyl, ethyl, isopropyl, sec.butyl, tert.butyl, tert.pentyl, 3-pentyl, cyclopropyl, cyclobutyl, 3-cyanopropyl, 3-phenyl propyl, or adamantyl, as well as to a process for their production.

In accordance with the invention a compound of formula I is obtained by reacting 1-(2,3-epoxypropoxy)-9-fluorenone, or a 1-(3-halogen-2-hydroxypropoxy)-9-fluorenone, wherein halogen is chlorine or bromine, or a mixture of the epoxy compound and the halogen compound, with a compound of formula II, $$H_2NR \quad \quad II$$

wherein R has the above significance.

Acid addition salts may be produced from the free bases and free bases may be liberated from salts in conventional manner.

The reaction is preferably effected in an inert organic solvent, e.g. a cyclic ether such as dioxane, and has a duration of about 2 to 4 hours. The reaction temperature may range between about 20° and 120°C; the reaction is preferably effected at the boiling temperature of the reaction mixture under reflux, or in a pressure vessel.

Working up is preferably effected by shaking out the reaction mixture between an aqueous acid, e.g. 1 percent tartaric acid, 1N hydrochloric acid, and an inert organic solvent which is not miscible with the acid, such as ethyl acetate. The aqueous phases are combined, made alkaline and shaken out with an inert organic solvent which is not miscible with the aqueous phases, e.g. a chlorinated aliphatic hydrocarbon such as methylene chloride. The combined organic phases are dried, concentrated by evaporation at reduced pressure, and the resulting crude compounds of formula I are purified in known manner, e.g. by crystallization.

1-(2,3-Epoxypropoxy)-9-fluorenone is also new. It may, for example, be produced by adding an excess of epichlorhydrin or epibromhydrin to 1-hydroxy-9-fluorenone in the presence of a base, and heating the reaction mixture for an extended period, e.g. 2 to 24 hours, preferably with stirring. Suitable bases which may be used are, for example, secondary amines, preferably piperidine, but morpholine, pyrrolidine or dimethyl amine may likewise be used. The addition of a small amount of base, preferably piperidine, suffices for the obtention of good yields. Tertiary amines such as triethyl amine, pyridine or other organic bases may, for example, likewise be used in place of secondary amines. Working up is effected by distilling off the excess of epichlorhydrin or epibromhydrin, optionally in a vacuum, dissolving the residue, e.g. in an inert organic solvent, for example an aromatic hydrocarbon such as benzene or toluene, or a chlorinated hydrocarbon such as methylene chloride, and shaking out with an alkali, e.g. 2 N sodium hydroxide. The organic phases are separated, combined, dried, e.g. over magnesium sulphate, and the solvent is evaporated at reduced pressure.

1-(2,3-Epoxypropoxy)-9-fluorenone may, for example, also be obtained by treating a 1-(3-halogen-2-hydroxypropoxy)-9-fluorenone, wherein halogen has the above significance, with an alkali.

Reaction of an alkali metal or ammonium salt of 1-hydroxy-9-fluorenone, in solution or in suspension with epichlorhydrin or epibromhydrin, yields a mixture of the epoxy compound and the halogen alcohol, the relationship of the reaction products being dependent on the reaction conditions. Since both reaction products in the process of the invention yield the same final product, it is not necessary to effect a separation of the mixture, although this may be readily effected, e.g. by chromatography.

1-Hydroxy-9-fluorenone may, for example, be obtained from 1-amino-9-fluorenone, via the diazonium salt.

Insofar as the production of the required starting materials is not described, these are known or may be produced in accordance with known processes or in a manner analogous to the processes described herein or to known processes.

The fluorenone derivatives of formula I and their acid addition salts have hitherto not been described in the literature. They exhibit interesting pharmacodynamic properties in tests with animals and are therefore indicated for use as medicaments.

The compounds are useful β-adrenergic blocking agents, or more particularly, the compounds have a blocking effect on the adrenergic β-receptors as indicated by a strong inhibition of the tachycardia and hypotension caused by isoproterenol in the infusion test on the narcotized cat.

For the above-mentioned use, the dosage administered will, of course, vary depending upon the compound employed, mode of administration and treatment desired. However, in general satisfactory results are obtained at daily dosages between 0.5 and 15 mg/kg animal body weight, conveniently given in divided doses two or three times a day or in sustained release form. For the larger mammals, the total daily dosage ranges from about 10 to about 400 mg and dosage forms suitable for oral administration contain between about 3 to about 200 mg of the compound admixed with a solid or liquid pharmaceutical carrier or diluent.

The compounds are furthermore useful in inhibiting platelet aggregation as indicated by the in vitro test employing adenosine diphosphate with platelet-rich rabbit plasma (turbidimetric method in accordance with Bron). An almost complete inhibition (80 to 100 percent) is observed at a concentration of about 50 μg/ml. Due to this effect, the compounds are indicated for use in the prophylaxis and therapy of diseases in which platelet aggregation plays a role, such as thromboembolitic complications and microcirculation disorders.

In the following non-limitative Examples, all temperatures are indicated in degrees Centigrade and are uncorrected.

EXAMPLE 1

1-(2-Hydroxy-3-isopropylaminopropoxy)-9-fluorenone 33 g of 1-hydroxy-9-fluorenone, 170 cc of epichlorhydrin and 0.3 cc of piperidine are heated to the boil with stirring for 15 hours, the mixture is then concentrated by evaporation and the residue is shaken out between benzene and 2 N sodium hydroxide. The benzene phase is dried over magnesium sulphate and the solvent is removed by evaporation at reduced pressure.

20 g of the oily residue obtained above are taken up in 25 cc of isopropylamine and 100 cc of dioxane, and the mixture is heated to the boil for 18 hours. The mixture is evaporated to dryness at reduced pressure and the residue is shaken out between ethyl acetate and a 1 N tartaric acid solution. The tartaric acid phases are made alkaline with 5 N sodium hydroxide and are subsequently extracted with methylene chloride. The evaporation residue of the methylene chloride phases which have been dried over magnesium sulphate is crystallized with ethyl acetate. The title compound crystallizes in needles having a M.P. of 87°–92°. The hydrogen maleate of this compound crystallizes from acetone/ethyl acetate with a M.P. of 100°–103°.

The 1-hydroxy-9-fluorenone, used as starting material, may be produced by diazotization of 1-amino-9-fluorenone and concentration of the resulting diazonium salt. M.P. 110°–115°.

EXAMPLE 2

1-(2-Hydroxy-3-tert.butylaminopropoxy)-9-fluorenone

This compound is obtained in a manner analogous to that described in Example 1, except that tert.butyl amine is used in place of isopropyl amine. The hydrogen maleate of the title compound crystallizes from acetone/ethyl acetate in druses having a M.P. of 128°–132°.

EXAMPLE 3

1-(2-Hydroxy-3-tert.pentylaminopropoxy)-9-fluorenone

This compound is obtained in a manner analogous to that described in Example 1, except that tert.pentyl amine is used in place of isopropyl amine. The title compound crystallizes from ethyl acetate/ether in yellow prisms having a M.P. of 88°–96°.

EXAMPLE 4

1-(2-Hydroxy-3-cyclopropylaminopropoxy)-9-fluorenone

This compound is obtained in a manner analogous to that described in Example 1, except that cyclopropyl amine is used in place of isopropyl amine. The title compound crystallizes from ethyl acetate in yellow prisms having a M.P. of 81°–85°.

EXAMPLE 5

1-(2-Hydroxy-3-isopropylaminopropoxy)-9-fluorenone

This compound is obtained in a manner analogous to that described in Example 1, except that epibromhydrin is used in place of epichlorhydrin. The title compound which is identical with the product produced in accordance with Example 1, is obtained. M.P. 87°–92° after crystallization from ethyl acetate.

EXAMPLE 6

1-(2-Hydroxy-3-tert.butylaminopropoxy)-9-fluorenone

This compound is obtained in a manner analogous to that described in Example 2, except that epibromhydrin is used in place of epichlorhydrin. The title compound which is identical with the product produced in accordance with Example 2, is obtained. M.P. 128°–132° after crystallization from acetone/ethyl acetate.

EXAMPLE 7

1-(2-Hydroxy-3-tert.pentylaminopropoxy)-9-fluorenone

This compound is obtained in a manner analogous to that described in Example 3, except that epibromhydrin is used in place of epichlorhydrin. The title compound which is identical with the product produced in accordance with Example 3, is obtained. M.P. 88°–96° after crystallization from ethyl acetate/ether.

EXAMPLE 8

1-(2-Hydroxy-3-cyclopropylamiopropoxy)-9-fluorenone

This compound is obtained in a manner analogous to that described in Example 4, except that epibromhydrin is used in place of epichlorhydrin. The title compound which is identical with the product produced in accordance with Example 4, is obtained. M.P. 81°–85° after crystallization from ethyl acetate.

What is claimed is:

1. A compound of the formula:

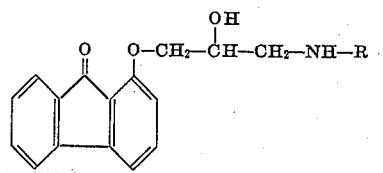

wherein R is methyl, ethyl, isopropyl, sec.butyl, tert.butyl, tert.pentyl, 3-pentyl, cyclopropyl, cyclobutyl, or a pharmaceutically acceptable acid addition salt thereof.

2. The compound of claim 1, which is 1-(2-hydroxy-3-isopropylaminopropoxy)-9-fluorenone.

3. The compound of claim 1, which is 1-(2-hydroxy-3-tert.butylaminopropoxy)-9-fluorenone.

4. The compound of claim 1, which is 1-(2-hydroxy-3-tert.pentylaminopropoxy)-9-fluorenone.

5. The compound of claim 1, which is 1-(2-hydroxy-3-cyclopropylaminopropoxy)-9-fluorenone.

* * * * *